Aug. 15, 1961 R. V. BURTON 2,996,045
TIME MODULATED HYDRAULIC SERVO VALVE
Filed July 16, 1959
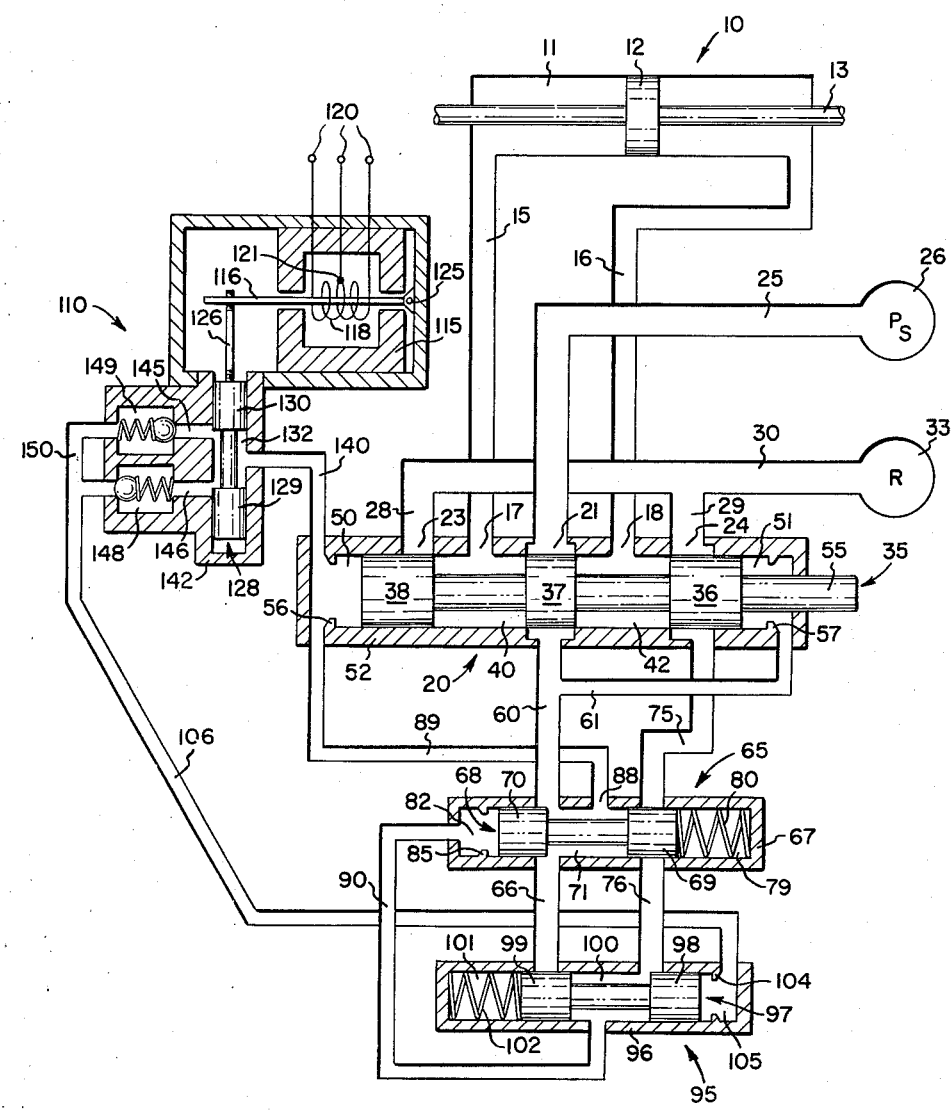
INVENTOR.
ROBERT V. BURTON
BY Joseph E. Ryan
ATTORNEY

United States Patent Office 2,996,045
Patented Aug. 15, 1961

2,996,045
TIME MODULATED HYDRAULIC SERVO VALVE
Robert V. Burton, Minneapolis, Minn., assignor to Minneapolis-Honeywell Regulator Company, Minneapolis, Minn., a corporation of Delaware
Filed July 16, 1959, Ser. No. 827,580
10 Claims. (Cl. 121—38)

My invention relates to hydraulic servo valves and more particularly to an improved type of time modulated hydraulic servo valve. While time modulation of hydraulic servo valves has previously been utilized, the arrangements for providing such operation have generally been complex and have required specialized auxiliary equipment to generate the carrier oscillation or vibration necessary to perform the time modulating operation. In electrically controlled hydraulic servo valves this has been accomplished through the use of a carrier oscillation generated by a separate vibrating apparatus or oscillators in addition to the control signal to provide for complex circuitry rather than to provide for complex circuiting and this required special circuitry. Mechanical pilot valves may be vibrated through external vibrating apparatus but this in turn complicates the apparatus. The present invention is directed to an improved electro-hydraulic time modulated servo valve in which an electrical operator merely determines the on and off time of operation, and the hydraulic arrangement is of the self contained type. The oscillation or generation of the carrier frequency or oscillation is obtained through the valving arrangement operated from the main pressure supply to provide a self contained multivibrator or unbalancer control from the pressure source. Further with this arrangement a relatively low or small electrical signal controls the apparatus and hydraulic power from the pressure source provides the switching. Therefore, it is the object of this invention to provide an improved electro hydraulic time modulated servo valve. It is a further object of this invention to provide an apparatus of this type, a self contained hydraulic operating multivibrator or unbalancer to generate the carrier oscillation for the valve. It is a further object of this invention to provide in a time modulated hydraulic servo valve an arrangement in which a relatively small electrical current is required to control the main servo valve. These and other objects of this invention will become apparent from the reading of the attached description together with the drawing which shows a schematic disclosure of the apparatus.

The time modulated hydraulic servo valve is shown in the sketch as connected to an actuator indicated generally at 10 including a cylinder section 11 and a movable piston element 12 having output connection means or shaft 13 connected thereto. The actuator 10 is shown as connected to the cylinder ports or through conduits 15, 16 to ports 17, 18 of the servo valve indicated generally at 20. The actuator shown herein is of the floating piston type and servo valve 20 as it oscillates at the carrier frequency will control flow to the opposite extremities of the piston to vary its rate of movement in one direction or the other. When the device to be actuated is loaded or connected in a closed servo loop, it will be moved to a position in proportion to differential between on and off-time of the servo valve, as will be later described, or the pressure differential output of the servo valve 20. The valve 20 is generally a conventional four way valve including a supply port 21 and a pair of return ports 23, 24 which are adapted to be connected respectively to a supply conduit 25 leading to a pressure source indicated schematically at 26 with the return ports 23, 24 being connected to conduits 28, 29 to a common conduit 30 leading to a return or sump indicated schematically at 33. The movable element of valve 20 is a spool assembly 35 having a plurality of lands 36, 37, 38 thereon defining dwell portions 40, 42 therebetween. The centrally located land 37 is associated with the supply port 21 and movement valve element 35 or spool assembly opens the supply port to one or the other of the dwell portions 40, 42 with which the cylinder ports 17, 18 are associated to throttle supply flow to one or the other of the cylinder conduits 15, 16. Similarly the externally positioned lands 36, 38, associated with the return ports 23, 24, will control flow from the cylinder port opposite that associated with the supply port to connect the same to the return line 30.

Also included with the main servo valve or boost valve are ram sections or pressure responsive means defined by the chambers 50, 51 at the extremities of the casing or housing 52 and the extremities of the lands 36, 38. The chamber 51 has a considerably smaller ram area than chamber 50 through the inclusion of a shaft 55 which extends through the end of the housing 52 and also serves as a guide for spool assembly 35. In addition the chambers include stop means 56, 57 at the extremities thereof to limit the movement of the shaft or movable element or spool 35 of the valve 20. The supply conduit 25 or the port 21 is enlarged circumferentially in the valve casing or housing 52 so as to provide an additional passage around the land and to a conduit 60 leading to a conduit 61 to the chamber 51 to provide a continuous pressure in the chamber 51 urging the movable element or spool assembly 35 to the left as shown in the drawing. In addition conduit 60 extends to the valve port or housing of the first control valve or shifter valve indicated at 65 with the supply port or conduit continuing through the valve to a conduit 66. The valve 65 has a housing 67 and a spool assembly indicated generally at 68 having a pair of lands 69, 70 thereon and a dwell portion 71 positioned therebetween. The land 70 affects an on-off operation on the conduit 60, 66 from the supply port or conduit 25 and a similar conduit 75 from the return port 24 which is enlarged circumferentially extends beyond the valve 65 through a conduit 76 to be controlled in an on-off operation by the land 69. Shifter valve 65 includes a spring 80 located in a chamber 79 at one extremity of the valve housing and a second chamber or pressure responsive means 82 defined by the housing and the land 70 which with the spring 80 will control the shifting of the valve spool 68 between extreme positions defined by the limit stops 85. As the spool assembly 68 is moved it will oscillate between a closing position for conduit 75, 76 to the return line and a closing position for the conduits 60, 66 for the supply line. Shifter valve 65 also includes a port 88 associated with the dwell portion 71 of the valve which is connected through a conduit 89 to the pressure chamber 50 of servo valve 20 to supply hydraulic fluid under pressure thereto. Ram section or pressure responsive chamber 82 of the shifter valve or the first control valve is also connected through a conduit 90 to a second control valve 95 having a casing 96 and a spool assembly 97 with a pair of lands 98, 99 thereon and defining a dwell portion 100 therebetween. The conduits 66 and 76 lead to second control valve 95 which is basically a timing valve, as will be later pointed out, and is of the same general configuration as the first control valve in that it includes in addition to the two land spool assembly, a chamber 101 having a spring 102 therein for shifting the spool assembly to the right as indicated in the drawings and a pressure chamber 105 defined between the casing 96 and the land 98 which acts as a ram section or pressure responsive means to urge the spool assembly to the left as indicated in the drawing against the force of the spring 102. The pressure responsive chamber or ram section 105 which includes limit stops 104 is connected as indicated in the drawing through a conduit 106 to an electromagnetically operated proportioning valve indicated generally at 110. In addition it will be noted that the supply conduit 66 and return conduit 76 lead to the housing 96 and communicate respectively with the outlet conduit 90 connected to the ram chamber 82 of control valve 65 and being controlled respectively by the lands 98, 99 respectively. It will further be noted that the second control valve or timing valve is of a general three way configuration and the supply and return lines are controlled by the position of the spool assembly 68 for the first control valve 65.

The electromagnetically operated proportioning valve or unbalancing valve includes a magnetic core structure 115 cooperating with a pivoted armature 116, the armature having an electric coil assembly 118 mounted thereto and adapted to be connected to the signal source through conductors 120. Actually the coil 118 is tapped as at tap 121 to provide for differential energization of the coil and hence reversible or differential movement of the armature which is pivoted on the housing as at 125. Armature 116 has connected thereto a linkage 126 leading to a spool assembly 128 of the unbalancing valve which includes lands 129, 130 with a dwell portion 132 therebetween. The ram chamber 50 of the servo valve 20 has a conduit 140 leading therefrom and connected to a housing 142 of the unbalancing valve with a pair of outlet conduits 145, 146 leading therefrom. These conduits including check valves 148, 149 respectively with a common fluid connection 150 therebetween connected to the conduit 106 leading to the ram chamber 105 of the second control valve 95. The proportioning valve or unbalancing valve in proportion to the position of the spool assembly 128 as dictated by the electromagnetic actuator or the armature 116 will vary the flow through the conduits 140, 145, 146 and the check valves 149, 148 depending upon the direction of flow to the conduit 150 and 106 leading to and from the chamber 105 of the second control valve 95. In effect the flow to the ram chamber 105 or the flow therefrom through the unbalancing valve will be determined by the position of the spool assembly to control the on-time of the main boost valve or servo valve 20.

As indicated herein this valve apparatus contains the mechanism for hydraulically generating the balanced wave output valve carrier frequency as well as the apparatus for controlling the length of on-time for each half cycle of the valve operation. This electrically controlled time modulated hydraulic valve utilizes a hydraulic carrier frequency generation as distinguished from electrically oscillating a pilot valve to generate the carrier frequency. The electrical coil assembly operates to position only the small unbalancing valve in proportion to the signal input to control the differential position of the boost valve or servo valve and hence the operation of the actuator associated therewith which is shown herein as a piston type hydraulic actuator but may be of any suitable dual pressure responsive device. Considering the disclosure and assuming the unbalancing valve 110 as centered, that is, as receiving no differential input signal, the supply pressure enters from the source 26 through the conduit 25 and port 21 to the conduits 60, 61 leading to the shifter valve and the ram section 51 of the servo valve 20. With the start up of the system, the shifter and timing valve 65 and 95, respectively, will have an absence of pressure in the respective ram sections 68, 97 and the spools will be moved in the direction dictated by the springs 80, 102. In connection with this apparatus it should be noted that the valve ports are relatively large to provide for relatively high rates of flow through the valving, that is, in the boost valve and the shifter and timing valves, respectively. In addition, the unbalancing valve 110 will control flow rate to and from the timing valve, as will be later identified, by virtue of the position of the spool 128 which is controlled by the electromagnet. Applied pressure for the system normally ranges between 750 and 3,000 p.s.i. to provide for oscillation of the boost valve or servo valve 20 in the range from 200 to 300 c.p.s. with suitable porting of the shifter and timing valves for a balance condition in the unbalancing valve 10. Further, the actual valving of both the shifter and timing valve will take place when the respective ports are slightly cracked such as to rapidly change pressures on the respective ram sections, causing the main servo valve to move rapidly from one extremity to the other which will be hereinafter identified as snapping to a new position. This would generate a waveform in the frequency of oscillation of the servo valve and hence the device to be actuated thereby which approaches a square wave function as distinguished from one which is sinusoidal in nature. Therefore, upon start up of the system and with the unbalancing valve 110 centered, the flow from the source 26 will also take place through the conduit 60, the shifter valve 65 through the dwell portion 71 to the conduit 88, the ram section 50, conduit 140 and through the dwell portion 132 of the unbalancing valve to the conduit 145 and directional check leading to the conduits 150, 106 and the ram section 105 of timing valve 95. Since flow through the unbalancing valve is metered depending upon position of the spool assembly 128, a rapid buildup in pressure will be experienced in the chamber or ram section 50 which, because of the relative area compared with the ram section 51, will cause the spool assembly 35 to move to the right rapidly. The fluid flow through the unbalancing valve or the top port thereof and the directional check valve 149 will determine the on-time or length time in which the spool assembly 35 of servo valve 20 will remain in the right hand position. An increase in pressure in the ram chamber 105 will move the spool assembly 97 of the timing valve to the left, opening the porting from conduit 66 through conduit 90 to the ram section 82 of the shifter valve, which section has been previously connected through the dwell portion 100, conduit 76, conduit 75, porting 24, and return conduit 30. Thus the timing valve 95 will move to the left and with the cracking of the supply line from conduit 66 as the land portion 99 moves past the inlet port connected to the conduit 66 a rapid flow will take place through the dwell portion 100 to conduit 90 on the ram section 82 moving the shifter valve 65 to the right against the tension or bias of spring 80. As the spool assembly 68 of shifter valve 65 moves to the right, it will close the passage from conduit 60 through the dwell portion 71 to conduit 89 and open the passage from the conduit 89 through the dwell portion 71 to return conduits 75, 29 and 30 from the timing valve 65. Thus, with this change in valving, the ram section 105 of shifter valve 95 will be bled through the conduit 106, the directional check 148, conduit or porting 146, the land portion 132 of the unbalancing valve, conduit 140, ram chamber 50 through conduit 89, porting 88, conduits 75, 29 and 30 to the return line 33. In this direction of flow, the position of the spool assembly 28 of the unbalancing valve will regulate the off-time of the servo valve or the position in which the spool assembly 35 will remain in the left hand position or end of the casing. As the shifter valve 65 is cracked or slightly opened porting or venting the chamber 50 to the return line, the drop in pressure in ram section 50 will create a pressure differential in which the force in the ram chamber 51 predominates, snapping or moving the spool assembly 35 rapidly to the left. The controlled flow by the unbalancing valve acts on the ram chamber 105 of the timing valve 95 and it is the drop in pressure in the chamber 105 which controls the position of the spool assembly 97 such that the spring 102 will cause the spool assembly to move to the right after a time period as determined by the unbalancing valve 110. During this period of time, the ram chamber 82 of the shifter valve 65 will have been connected to the pressure source through the timing valve and will be in a right hand position overcoming the pressure of spring 80 to cause the ram section 50 of the main servo valve 20 to be connected to the return and the spool assembly 35 will remain in a left hand position. With the change in operation of the timing valve 95 to the right hand extremity caused by the drop in pressure in ram section 105, that is, its spool assembly moving to the right, the supply line to the ram chamber 82 from conduit 66 will be closed and the release line or relief line will be open through the dwell portion 100, conduits 76, 75, 29 and 30 to the return line, dumping or releasing pressure in the shifter valve 65 or the ram portion 82 thereof such that spring 80 will be effective to move the space assembly 68 to the left, and the vent line from the chamber 50 through to the return 33 will be closed and the inlet from the pressure supply conduit 60 will be cracked to allow fluid to rapidly flow through the dwell portion 71, port 88, conduit 89 to the ram section 50 and on to the unbalancing valve 110 through the conduit 140, as previously described, with the unbalancing valve controlling the on-time of the servo valve 20. This means that the rapid flow through the shifter valve 65 to the ram section 50 will create a pressure in the ram chamber 50 causing the spool assembly 35 to move to the right as the pressure in the ram chamber or the force developed therein overcomes force in the ram chamber 51. Because of the relatively high pressures involved and the large area portings, the flows are relatively rapid and the main servo valve will move rapidly from one extremity to the other in a snapping action.

Thus with the unbalancing valve 110 set for equal metering, in- and out-times to the timing valve 95, the servo valve will be controlled to move from left to right hand position rapidly in a balanced wave of constant carrier frequency which approaches a square wave configuration and produces equal timed pulses or flows of the valved fluid to the actuator device. The large porting and the high pressures produce rapid shifting of the spool 35 of the servo valve which spool includes land 37 controlling valving of the fluid from the pressure supply 26 through the conduit 25 to one or the other of the dwell portions 42, 40 to one or the other of the ports 17, 18 producing the output rate of flow to the actuator or device to be actuated indicated generally at 10. Depending upon the position of the spool, one or the other ports 17, 18 will be connected respectively to the outlet ports 23, 24 leading to the return or sump through the conduit 30 such that pressure will be applied to one or the other side of the device to be actuated in a conventional manner. When the unbalancing valve 110 is biased off the null position due to the differential energization of the winding 118 or the portions thereof, the relatively large volume flows through the unbalancing valve from the ram chamber 105 of the timing valve 95 will be varied to control the on- and off-time or the periods of time in which the spool assembly 35 of the servo valve is positioned relative to the cooperating cylinder ports controlling the device to be actuated. Whenever the flow times into and out of the timing valve 95 are varied by the shift in position of unbalancing valve 110, the length of time in which the spool assembly 35 of the servo valve will remain in one position relative to the opposite position will vary and thus the device to be actuated by the servo valve will assume a corresponding shift from a null position. As previously indicated, the frequency of oscillation for a balanced condition with a desired pressure will be in the range of 200 to 300 cycles per second which frequency will decrease with the shift of the servo valve from the null position in the conventional manner. The timing and shifter valves move in accordance with the differential between the pressures in their respective ram chambers and the forces generated by their respective springs. However, it should be understood that these spring chambers could be replaced by a suitable biasing force of the hydraulic type such as a line from the pressure supply to a reduced size chamber or working surface which would replace the springs. In actual operation, merely cracking the valve open will, in either the timing or shifter valves, provide a relatively large flow to or from the ram chamber of the servo valve 20 which will cause a definite change in valving to give the oscillation or generate the carrier frequency obtained. In actual practice the movements of the valves are relatively small and the flows large to create the frequency of oscillation obtained.

Thus, it will be seen that the carrier frequency generator is of the hydraulic type and the power supplied for performing the switching operation is hydraulic with electrical control superimposed on the hydraulic switching circuit to vary the on- and off-time or the metering rates from the respective timing and shifting valves to vary the position of the servo valve spool 35 to control the on- and off-time of the carrier frequency supplied to the device to be actuated.

In considering this invention it is intended that the present disclosure be considered as illustrative only, and the scope of the invention will be determined by the appended claims.

What is claimed is:

1. A time modulated hydraulic servo valve comprising, a four-way servo control valve including a spool and housing assembly providing a plurality of land and dwell portions and including a supply port controlled by a central land portion and a pair of cylinder ports connected respectively to the dwell portions between the centrally located land and the remaining land portions positioned at the extremities of said spool, return ports connected to and controlled by the remaining land portions of said spool, means including said housing and said spool providing ram sections of differential areas at the extremities of said valve to actuate said valve between its extreme positions and control flow from said supply port to said respective cylinder ports and from said respective cylinder ports to said return ports, a source of fluid pressure and a return line connected respectively to said supply port and return ports of said valve, a shifter valve having a housing and spool assembly providing a pair of lands and an intermediate dwell portion, fluid connection means connecting said source of supply to said shifter valve to be controlled by one of said lands and said return line to be controlled by the other of said lands, motive means for operating said shifter valve including a ram section defined by the extremity of one of said lands and said casing and a spring at the extremity of the other of said lands to cause said shifter valve to move in one or the other direction, a timing valve similar in construction to the shifter valve, conduit means connecting said timing valve to said shifter valve such that the supply port for the timing valve is connected to and controlled by the land on the shifter valve and the return port is connected to and controlled by the land of the shifter valve, additional conduit means connecting the dwell portion of the timing valve to the ram section of the shifter valve, further conduit means connecting the dwell portion of the shifter valve to the ram portion having the larger of the differential areas of the four-way control valve, conduit means connecting the other ram portion of said control valve directly to the source of fluid pressure, and an unbalancing valve including an electromagnetic actuator and a pilot valve controlling a pair of ports and connected to the first named ram portion of said control valve with oppositely disposed check valves in the outlet side thereof and connected through a common fluid conduit to the ram section of the timing valve, said unbalancing valve being controlled by differential current supplied to the electromagnetic actuator and operating to control through said check valves, the rate of flow to and from timing valve controlling the length of travel of said four-way servo valve and the frequency of oscillation of the same.

2. A time modulated hydraulic servo valve comprising, a four-way servo control valve including a spool and housing assembly providing a plurality of lands with dwell portions therebetween and including a supply port controlled by a central land and a pair of cylinder ports connected respectively to the dwell portions between the centrally located land and the remaining lands positioned at the extremities of said spool, return ports connected to and controlled by the externally positioned lands of said spool, means including said housing and said external lands of said spool to provide ram sections of differential area at the extremities of said valve to actuate said valve between its extreme positions and control flow from said supply port to said respective cylinder ports and from respective cylinder ports to said return ports, a source of fluid pressure and a return line connected respectively to said supply port and return ports of said valve, a shifter valve including a housing and valve element and having a pair of on and off flow passages therethrough defined by a pair of aligned ports cooperating with a pair of lands separated by a dwell portion, each of said pair of ports being connected to the pressure source and return line respectively independent of the four-way valve, said shifter valve including a ram section for moving the valve element in one direction and a spring for biasing and moving the valve element in the opposite direction to open and close said pairs of ports, a timing valve having a three-way configuration with a plurality of ports two of which are connected to the pressure source and return line of the shifter valve to be controlled thereby and a center port connected to the ram section of the shifter valve, said timing valve including a spring to control switching of the valve in one direction and a ram section to control switching in the opposite direction, an electrically controlled unbalancing valve proportionately positioned in accordance with an electrical input signal and connected at the dwell portion of the shifter valve and to the ram section of the servo valve supplying fluid under pressure to the ram section of the timing valve at a controlled rate proportional to the operation of the unbalancing valve, directional check valve means including a fluid connection means connecting the timing valve, said unbalancing valve and said servo valve with the shifter valve such that the movement of the timing valve and the operation of the shifter valve will control the oscillation of the servo valve.

3. A time modulated hydraulic servo valve comprising, a four-way hydraulic servo valve including a valve body and a spool assembly having a plurality of lands and dwell portions, a supply conduit means connected to said valve body and controlled by a centrally located land on said spool, a pair of cylinder conduits connected to said valve body and associated with the dwell portions of said valve such that said centrally located land controls flow selectively to one or the other of the cylinder conduits, return line conduits connected to the valve body and controlled by externally positioned lands on said valve spool, said externally positioned lands further cooperating with said valve body to provide ram chambers for shifting said spool cyclically and in proportion to the pressures applied to the respective ram portions, a first control valve energized from said supply conduit means and controlling the pressure in at least one of said ram chambers of said servo valve to control the oscillation of the spool and hence the fluid flow to the cylinder conduits of said servo valve, a second control valve connected to and controlling the operation of the first named control valve, and means including an electromagnetically operated proportioning valve for controlling with said first named control valve the rate of pressure change in said one of said ram chambers on said main servo valve and operatively connected to said second named control valve to control the switching operation of said first named control valve.

4. A time modulated hydraulic servo valve comprising, a four-way servo control valve including a spool and housing assembly providing a plurality of land and dwell portions and including a supply port controlled by a central land portion and a pair of cylinder ports connected respectively to the dwell portions between the centrally located land and the remaining land portions positioned at the extremities of said spool, return ports connected to and controlled by the remaining land portions of said spool, pressure responsive motive means associated with said spool to actuate said valve between its extreme positions and control flow from said supply port to said respective cylinder ports and from said respective cylinder ports to said return ports, a source of fluid pressure and a return line connected respectively to said supply port and return ports of said valve, a shifter valve having a housing and spool assembly providing a pair of lands and an intermediate dwell portion, fluid connection means connecting said source of supply to said shifter valve to be controlled by one of said lands and said return line to be controlled by the other of said lands, motive means for operating said shifter valve including a ram section defined by the extremity of one of said lands and said casing and a spring at the extremity of the other of said lands to cause said shifter valve to move in one or the other direction, a timing valve similar in construction to the shifter valve, conduit means connecting said timing valve to said shifter valve such that the supply port for the timing valve is connected to and controlled by the land on the shifter valve and the return port is connected to and controlled by the land of the shifter valve, additional conduit means connecting the dwell portion of the timing valve to the pressure responsive motive means of the shifter valve, further conduit means connecting the dwell portion of the shifter valve to the pressure responsive motive means of said four-way control valve, and an unbalancing valve including an electromagnetic actuator and a pilot valve controlling a pair of ports and connected to the said pressure responsive motive means of said control valve with oppositely disposed check valves in the outlet side thereof and connected through a common fluid conduit to the motive means of the timing valve, said unbalancing valve being controlled by differential current supplied to the electromagnetic actuator and operating to control through said check valves, the rate of flow to and from the timing valve controlling the length of travel of said four-way servo valve and the frequency of oscillation of the same.

5. A time modulated hydraulic servo valve comprising, a four-way servo control valve including a spool and housing assembly providing a plurality of land and dwell portions and including a supply port controlled by a central land portion and a pair of cylinder ports connected respectively to the dwell portions between the centrally located land portions positioned at the extremities of said spool, return ports connected to and controlled by the remaining land portions of said spool, means including a pressure responsive motive means to actuate said valve between its extreme positions and control flow from said supply port to said respective cylinder ports and from said respective cylinder ports to said return ports, a source of fluid pressure and a return line connected respectively to said supply port and return ports of said valve, a shifter valve having a housing and spool assembly providing a pair of lands and an intermediate dwell portion, fluid connection means connecting said source of supply to said shifter valve to be controlled by one of said lands and said return line to be controlled by the other of said lands, motive means for operating said shifter valve including a ram section defined by the extremity of one of said lands and said casing and a spring at the extremity of the other of said lands to cause said shifter valve to move in one or the other direction, a timing valve similar in construction to the shifter valve, conduit means connecting said timing valve to said shifter valve such that the supply port for the timing valve is connected to and controlled by the land on the shifter valve and the return port is connected to and controlled by the land of the shifter valve, additional conduit means connecting the dwell portion of the timing valve to the ram section of the shifter valve, further conduit means connecting the dwell portion of the shifter valve to the pressure responsive means of the four-way control valve, and an unbalancing valve including an electromagnetic actuator and a pilot valve controlling a pair of ports and connected to the first named ram portion of said control valve with oppositely disposed check valves in the outlet side thereof and connected through a common fluid conduit to the ram section of the timing valve, said unbalancing valve being controlled by differential current supplied to the electromagnetic actuator and operating to control through said check valves, the rate of flow to and from the timing valve controlling the length of travel of said four-way servo valve and the frequency of oscillation of the same.

6. A time modulated hydraulic servo valve comprising a four-way servo control valve including a spool and housing assembly providing a plurality of lands with dwell portions therebetween and including a supply port controlled by a central land and a pair of cylinder ports connected respectively to the dwell portions between the centrally located land and the remaining lands positioned at the extremities of said spool, return ports connected to and controlled by the externally positioned lands of said spool, means including said housing and said external lands of said spool to provide pressure responsive motive means at the extremities of said valve to actuate said valve between its extreme positions and control flow from said supply port to said respective cylinder ports and from respective cylinder ports to said return ports, a source of fluid pressure and a return line connected respectively to said supply port and return ports of said valve, a shifter valve including a housing and valve element and having a pair of on and off flow passages therethrough defined by a pair of aligned ports cooperating with a pair of land portions separated by a dwell portion, a port or each of said pair of ports being connected to the pressure source and return line respectively independent of the four-way valve, said shifter valve including a pressure responsive motive means for moving the valve element in one direction and a spring for biasing and moving the valve element in the opposite direction to open and close said pairs of ports, a timing valve having a three way configuration with a plurality of ports two of which are connected to the supply and return lines of the shifter valve to be controlled thereby and a center port connected to the pressure responsive motive means of the shifter valve, said timing valve including a spring to control switching of the valve in one direction and a pressure responsive motive means to control switching in the opposite direction, an electrically controlled unbalancing valve proportionately positioned in accordance with an electrical input signal and connected at the dwell portion of the shifter valve and to the pressure responsive motive means of the servo valve supplying fluid under pressure to the pressure responsive motive means of the timing valve at a controlled rate proportional to the operation of the unbalancing valve, directional check valve means including a fluid connection means connecting the timing valve, said unbalancing valve and said servo valve with the shifter valve such that the movement of the timing valve and the operation of the shifter valve will control the oscillation of the servo valve.

7. A time modulated hydraulic servo valve comprising, a four-way servo control valve including a spool and housing assembly providing a plurality of lands with dwell portions therebetween and including a supply port controlled by a central land and a pair of cylinder ports connected respectively to the dwell portions between the centrally located land and the remaining lands positioned at the extremities of said spool, return ports connected to and controlled by the externally positioned lands of said spool, means including a pressure responsive motive means associated with said spool at at least one extremity thereof to actuate said valve between extreme positions and control flow from said supply port to said respective cylinder ports and from respective cylinder ports to said return ports, a source of fluid pressure and a return line connected respectively to said supply port and return ports of said valve, a shifter valve including a housing and valve element and having a pair of on and off flow passages therethrough defined by a pair of aligned ports cooperating with a pair of land portions separated by a dwell portion, a port or each of said pair of ports being connected to the pressure source and return line respectively independent of the four-way valve, said shifter valve including a pressure responsive motive means for moving the valve element in one direction and a spring for biasing and moving the valve element in the opposite direction to open and close said pairs of ports, a timing valve having a three way configuration with a plurality of ports two of which are connected to the supply and return lines of the hifter valve to be controlled thereby and a center port connected to the pressure responsive motive means of the shifter valve, said timing valve including a spring to control switching of the valve in one direction and a pressure responsive motive means to control switching in the opposite direction, an electrically controlled unbalancing valve proportionately positioned in accordance with an electrical input signal and connected at the dwell portion of the shifter valve and to the pressure responsive motive means of the servo valve supplying fluid under pressure to the pressure responsive motive means of the timing valve at a controlled rate proportional to the operation of the unbalancing valve, directional check valve means including a fluid connection means connecting the timing valve, said unbalancing valve and said servo valve with the shifter valve such that the movement of the timing valve and the operation of the shifter valve will control the oscillation of the servo valve.

8. A time modulated hydraulic servo valve comprising: a four-way hydraulic servo valve including a movable element and having a supply port, a pair of cylinder ports, a pair of return ports; supply, cylinder, and return conduits connected to said valve; pressure responsive motive means associated with said valve and adapted to oscillate said movable element differentially from a neutral position to differentially control flow from the supply conduit to said respective cylinder conduits and from said cylinder conduits to said return conduit; a first control valve energized from said supply conduit means and controlling pressure differential in said pressure responsive means of said servo valve to control the oscillation of said movable element and hence the fluid flow to the cylinder conduits of the servo valve; a second control valve connected to and controlling the operation of said first named control valve; and means including an electromagnetically operated proportioning valve for controlling with said first named control valve the rate of pressure change in said pressure responsive motive means of said servo valve and operably connected to said second named control valve to control the switching operation of said first named control valve.

9. A time modulated hydraulic servo valve comprising: a four-way hydraulic servo valve including a movable element and having a supply port, a pair of cylinder ports, a pair of return ports; supply, cylinder, and return conduits connected to said valve; a pair of pressure responsive means differentially responding to pressures to vary said movable element of said valve and adapted to oscillate said movable element differentially from a neutral position to differentially control flow from the supply conduit to said respective cylinder conduits and from said cylinder conduits to said return conduit; a first control valve energized from said supply conduit means and controlling the pressure in at least one of said pressure responsive means of said servo valve to control the oscillation of the movable element and hence the fluid flow to the cylinder conduits of the servo valve; a second control valve connected to and controlling the operation of said first named control valve; and means including an electromagnetically operated proportioning valve for controlling with said first named control valve the rate of pressure change in said one of said pressure responsive means of said servo valve and operably connected to said second named control valve to control the switching operation of said first named control valve.

10. A time modulated hydraulic servo valve comprising: a four-way hydraulic servo valve including a movable element and having a supply port; a pair of cylinder ports, a pair of return ports; supply, cylinder, and return conduits connected to said valve; pressure responsive motive means associated with said servo valve and adapted to oscillate said movable element differentially from a neutral position to differentially control flow from the supply conduit to said respective cylinder conduits and from said cylinder conduits to said return conduit; a first control valve including a pair of on-off passages including a movable element movable between extreme positions to open and close said respective passages, conduit means connecting said passages of said first control valve to said supply conduit and said return conduit; motive means including a pressure responsive means associated with the movable element of said first control valve to effect movement of said movable valve element between extreme positions with variation in pressure applied to said pressure responsive means, a second control valve having supply, return and output conduit means with the supply and return conduits being connected to and controlled by said first named control valve, means including a pressure responsive means operating said second control valve with a variation in pressure at said pressure responsive means to effect a fluid passage therethrough from said supply conduit means to said output conduit means or from said output conduit means to said return conduit means; additional conduit means connecting said output conduit means of said second control valve to the pressure responsive means of said first control valve to control the operation of said first control valve; means including an electromagnetically operated proportioning valve connected to and controlling with said first named control valve the rate of pressure change in said pressure responsive means of said servo valve; and means connecting said proportioning valve to said pressure responsive means of said second named control valve to control the switching operation of said first named control valve.

References Cited in the file of this patent

UNITED STATES PATENTS 2,223,792    Muir                 Dec. 3, 1940